Dec. 16, 1969 C. T. CONSTANTINIDES ET AL 3,484,766

MEMORY APPARATUS UTILIZING PARALLEL PAIRS OF TRANSMISSION LINE CONDUCTORS HAVING NEGLIGIBLE MAGNETIC COUPLING THEREBETWEEN

Original Filed Dec. 27, 1962 3 Sheets-Sheet 1

INVENTORS
CHRISTOS T. CONSTANTINIDES
RICHARD P. HALVERSON
BY [signature]
ATTORNEY Dec. 16, 1969 C. T. CONSTANTINIDES ET AL 3,484,766

MEMORY APPARATUS UTILIZING PARALLEL PAIRS OF TRANSMISSION LINE CONDUCTORS HAVING NEGLIGIBLE MAGNETIC COUPLING THEREBETWEEN

Original Filed Dec. 27, 1962 3 Sheets-Sheet 2

INVENTORS
CHRISTOS T. CONSTANTINIDES
RICHARD P. HALVERSON
BY Herbert K. Sonnemeyer
ATTORNEY INVENTORS
CHRISTOS T. CONSTANTINIDES
RICHARD P. HALVERSON
BY [signature]
ATTORNEY United States Patent Office 3,484,766
Patented Dec. 16, 1969

3,484,766
MEMORY APPARATUS UTILIZING PARALLEL PAIRS OF TRANSMISSION LINE CONDUCTORS HAVING NEGLIGIBLE MAGNETIC COUPLING THEREBETWEEN

Christos T. Constantinides, Norman, Okla., and Richard P. Halverson, Minneapolis, Minn., assignors to Sperry Rand Corporation, New York, N.Y., a corporation of Delaware Continuation of abandoned application Ser. No. 247,753, Dec. 27, 1962. This application May 18, 1967, Ser. No. 648,519
Int. Cl. G11b 5/62
U.S. Cl. 340—174 9 Claims

ABSTRACT OF THE DISCLOSURE

A memory system utilizing strip transmission line conductors that couple the drive signals to the thin ferromagnetic film memory cores and that in turn couple the cores' external magnetic field variations to the sense amplifier. Included are a method of determining the impedance terminations of the parallel sense and drive lines to achieve infinite directivity therebetween, and dummy sense and drive lines and ground planes to improve the signal-to-noise ratio of the output signal at the sense amplifier.

CROSS-REFERENCE TO RELATED APPLICATION

The invention herein described was made in the course of or under a contract or subcontract thereunder with the Department of the Navy, and is a continuation application of parent application Ser. No. 247,753, filed Dec. 27, 1962, now abandoned.

BACKGROUND OF THE INVENTION

Memory systems as used in present day electronic data processing systems are the primary means where internally stored programs and data are made available for rapid access so as to perform the necessary data manipulations in the least amount of time. The computational speed of such electronic data processing systems is limited by the memory system access time and consequently improvements in storage techniques are constantly being sought. One such improvement has been the use of printed circuit drive and sense conductors in combination with thin ferromagnetic film cores. The term "printed circuit" when used herein shall include any method or apparatus wherein an electrically conductive material is disposed in accordance with a predetermined pattern on an electrically insulating base material. By the use of this technique the volumetric efficiency of the memory system, or bits per cubic inch, has increased many-fold. However, such increased packaging efficiency has brought with it many problems not inherent in the less densely packaged memories such as those utilizing ferrite toroidal cores. Decreased dimensions and signal amplitudes and increased signal speeds present problems well known in the microwave field but previously unknown in the computing art. Such problems include mutual interferences of closely situated drive and sense lines and spurious air coupling between such lines and other control signals and cores. S. M. Rubens et al., Patent No. 3,030,612, issued Apr. 17, 1962, assigned to the same assignee as is the present application, discloses a magnetic memory system using such printed circuit conductors and thin ferromagnetic film cores.

SUMMARY OF THE INVENTION

It has been discovered by the applicants that such printed circuit conductors when in a parallel arrangement behave as coupled strip transmission lines and are subject to the theory of wave propagation in a system of coupled transmission lines. When applying this theory to the parallel arranged printed circuit sense and digit lines in a word-organized thin film memory, the applicants have discovered that by terminating the sense and digit lines by impedances of properly selected values, coupling therebetween is reduced to a negligible level. Also, by utilizing a parallel dummy sense and digit line pair to provide a noise signal to one input of the sense line differential amplifier, the difference signal—the difference between the magnitudes of the noise and core outputs—is effectively separated from the noise signal by the sense line differential amplifier.

Accordingly, it is a primary object of the present invention to provide a memory apparatus wherein the sense line output is effectively isolated from spurious air and magnetic coupling with control fields and magnetic cores.

Another object of this invention is to provide a memory apparatus wherein there is provided a parallel set of parallel sense and digit line pairs whose ends are terminated in properly selected impedances so as to achieve minimum coupling therebetween.

Another object of this invention is to provide a memory apparatus wherein a parallel arranged set of dummy and active sense digit line pairs that are terminated in properly selected impedance matching resistances provide a substantially noise-cancelling sense line output.

A further object of this invention is to provide a method of determining the magnitudes of impedance matching resistances which couple the sense and digit lines of a thin film memory apparatus to ground or to return lines so as to achieve minimum coupling between the sense and digit lines.

A still further object of this invention is to provide a method of achieving minimum coupling between parallel arranged printed circuit sense and digit lines of a thin film memory apparatus.

A still further object of this invention is to provide a method of achieving a maximum signal-to-noise ratio from thin film memory apparatus having printed circuit input and output signal conductors.

DESCRIPTION OF THE PREFERRED EMBODIMENTS

Figure 1:
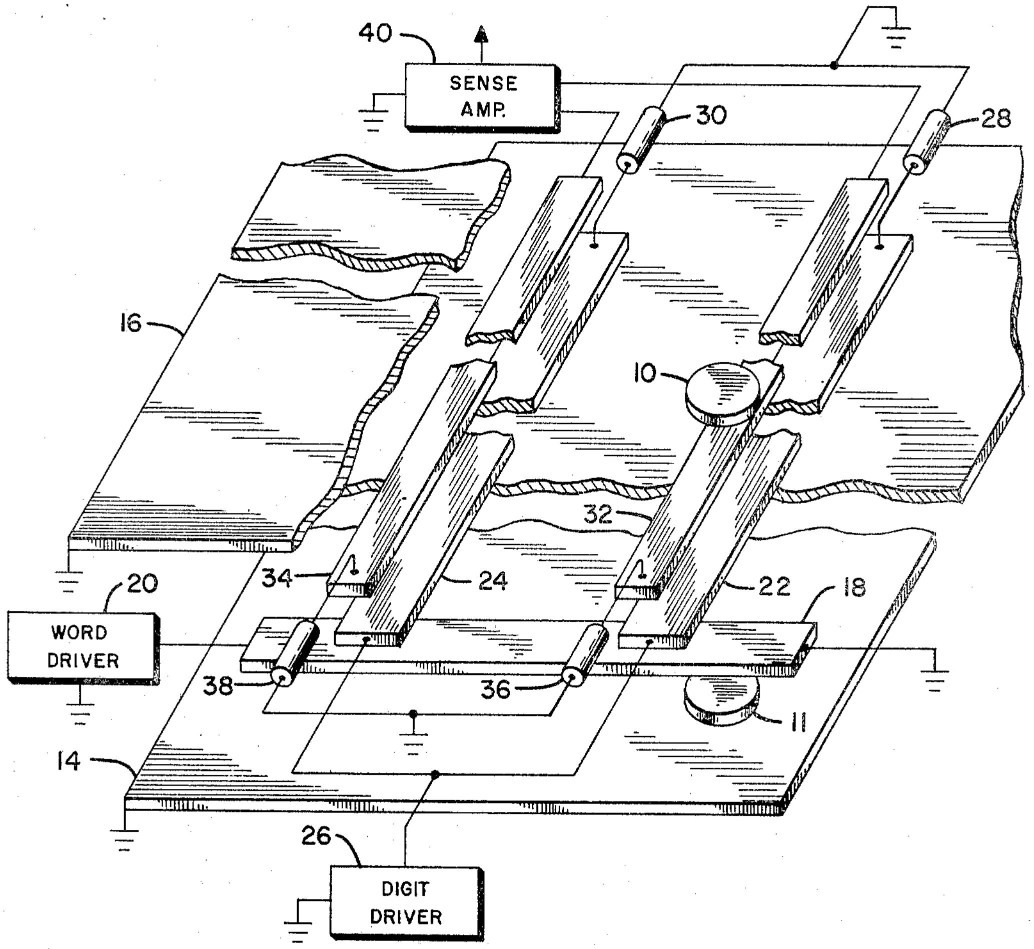
FIG. 1 is an exploded trimetric illustration of a memory apparatus utilizing printed circuit conductors, copper-clad ground planes and a pair of coupled thin-film cores.

FIG. 1 is an illustration of a preferred embodiment of a memory apparatus incorporating applicants' novel idea. Although the device of FIG. 1 depicts an exploded view of a single memory apparatus capable of storing only one bit of information it is to be appreciated that such concept may be expanded to a memory stack such as 30 planes each of an array of 64 x 64 cores per plane each providing a memory capacity of 4096 30-bit words. A memory stack of such dimensions may be fabricated in accordance with the methods disclosed in the patent application of S. M. Rubens et al., Ser. No. 13,361, filed Mar. 7, 1960, now Patent No. 3,115,561 patented Nov. 7, 1964, and assigned to the assignee of this invention.

In the embodiment of FIG. 1 there are disclosed thin-film cores 10 and 11 that are capable of being set into at least two substantially high flux-density remanent magnetic states by drive fields of proper magnitudes and directions. Cores 10 and 11 are of a single domain in thickness and preferably possesses the magnetic characteristic of unaxial anisotropy having a preferred axis of remanent magnetization. Cores 10 and 11, which may be fabricated in accordance with S. M. Rubens' Patent No. 2,900,282, issued Aug. 18, 1959, and assigned to the assignee of this invention, are formed upon any suitable support means such as glass substrates 12 and 13, respectively—see FIG. 3. Ground planes 14 and 16, which may be copper-laminated fiberglass sheets of 0.003 inch thickness copper-clad both sides by 0.0025 inch copper plate, are utilized as electro-magnetic shields and signal return lines. About ground plane 14 and centered below core 10 lies core 11. Immediately above core 11 word line 18 passes in a transverse direction with word driver 20 providing the necessary word drive signal to word line 18 whose opposite end is coupled to a common DC potential represented by ground planes 14 and 16. Above word line 18, parallel, coplanar conductors digit lines 22 and 24, pass in a longitudinal direction with digit line 22 lying below core 10 and passing between core 10 and word line 18. The forward ends of digit lines 22 and 24 are intercoupled to digit driver 26 providing the necessary digit drive signal to digit lines 22 and 24 whose opposite ends are coupled to a common DC potential by resistors 28 and 30, respectively. Above digit lines 22 and 24 and below core 10 a pair of parallel, coplanar conductors, sense lines 32 and 34 pass in a longitudinal direction with sense lines 32 and 34 being oriented substantially centered digit lines 22 and 24, respectively. Sense lines 32 and 34 at their forward ends are coupled to a common DC potential by resistors 36 and 38, respectively, with their opposite ends separately coupled to the two input terminals of differential amplifier 40. Resistors 28, 30, 36 and 38 are illustrated as being standard carbon resistors, no limitation thereto being intended. However, the formation of such resistors by a deposition process, as may be lines 18, 22, 24, 32 and 34, provides a package of highest volumetric efficiency.

In this embodiment cores 10 and 11 are oriented on a line formed by the intersection of the center lines of lines 22, 32 and 18 so as to provide optimum interaction at cores 10 and 11 of the magnetic fields generated by the digit and word drive fields. By this arrangement, sense line 32 is oriented with respect to cores 10 and 11, so as to provide maximum coupling of the varying external magnetic fields of cores 10 and 11 with the magnetic axis of line 32. Further, superposed pairs of sense and digit lines, such as sense line 32 and digit line 22, are substantially coupled to cores 10 and 11 while the other superposed pair, such as sense line 34 and digit line 24 are substantially uncoupled to cores 10 and 11. It has been discovered that if one utilizes a parallel pair of digit-sense lines per row of cores 10 and 11, such as lines 22 and 32 and lines 24 and 34, the noise induced in sense lines 32 and 34 due to a drive field pulse passing down word line 18, is substantially equal. Thus, as differential amplifier 40 amplifies only the difference signal on lines 32 and 34, its output is substantially free of noise. Thus, there is produced an output signal having an exceptionally high signal-to-noise ratio.

Figure 2:
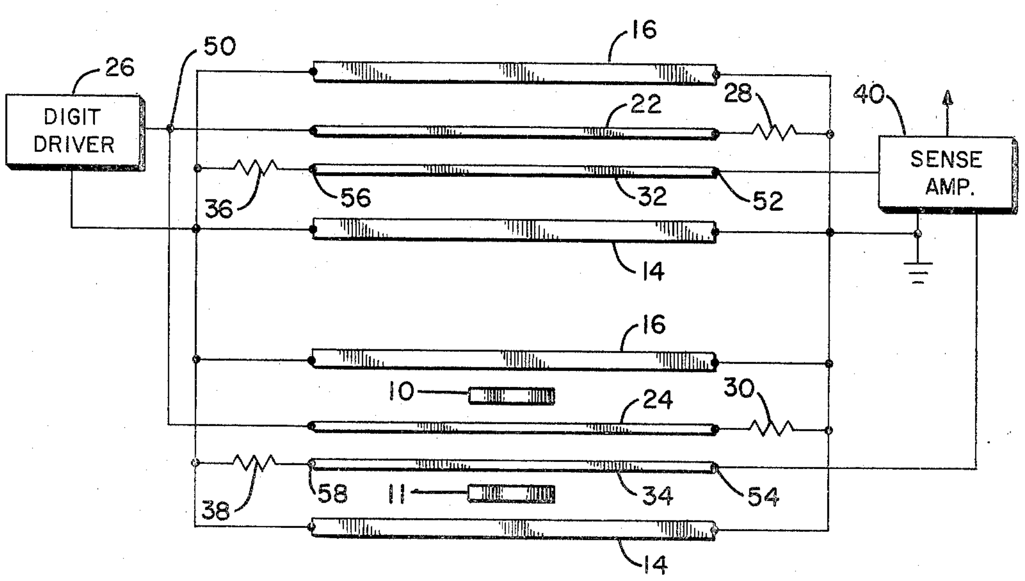
FIG. 2 is a diagrammatic illustration of the circuit schematic of the embodiment of FIG. 1.

FIG. 2 is a diagrammatic illustration of the circuit schematic of the embodiment of FIG 1. Applicants have discovered that lines 22 and 32 and lines 24 and 34 together with their return lines, such as ground planes 14 and 16, form a directional coupled transmission line system of theoretically infinite and practically very high directivity if terminated in impedances of properly chosen magnitudes. Thus, a voltage pulse emanating from driver 26 when coupled to digit lines 22 and 24 at point 50 induces negligible noise signals into sense lines 32 and 34 resulting in a negligible noise voltage pulse at points 52 and 54.

Figure 4:
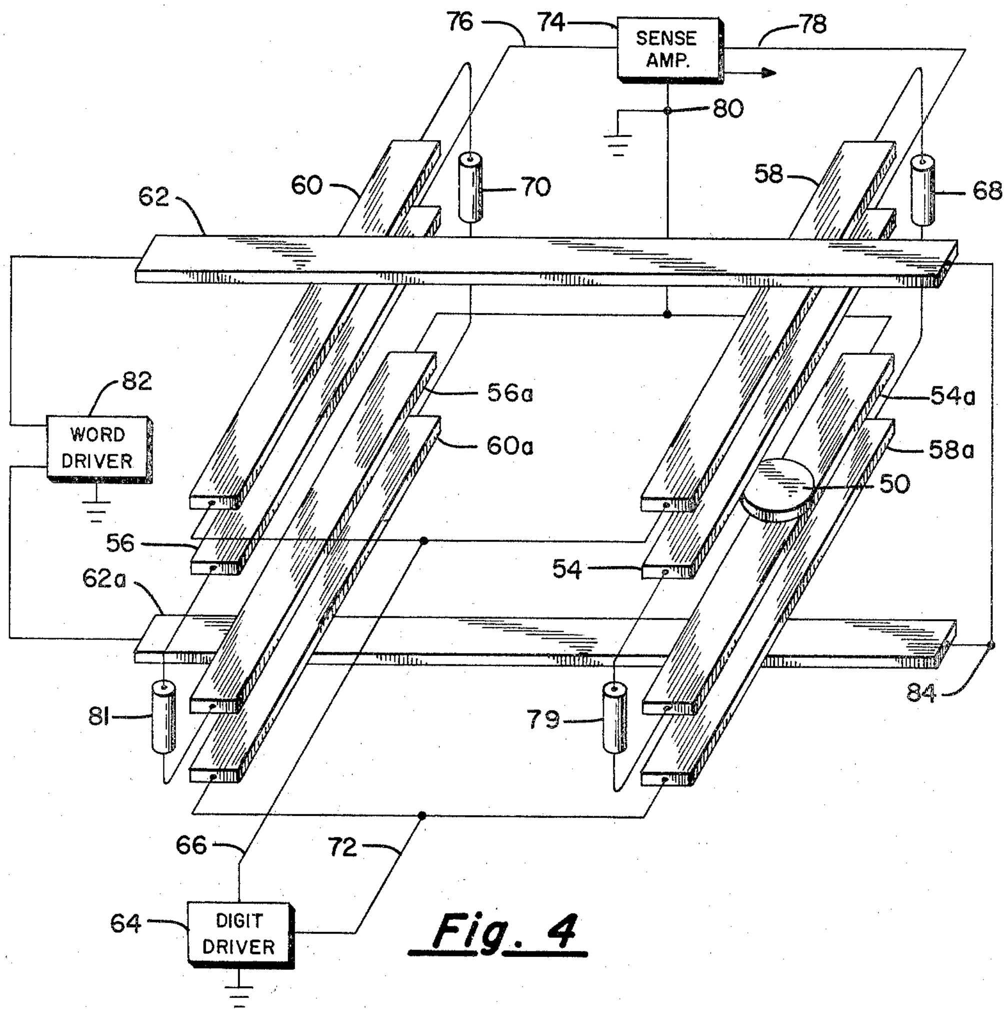
FIG. 4 is an exploded trimetric illustration of a memory apparatus utilizing printed circuit conductors as signal lines and signal return lines and a single thin-film core.

FIG. 4 is an illustration of another embodiment of a memory apparatus incorporating applicants' novel idea. As with the embodiment of FIG. 1, the memory apparatus of FIG. 4 may be expanded to provide a memory capacity of a plurality of multi-digit words. In this embodiment there is disclosed thin-film core 50 on substrate 52 which may be similar to core 10 and substrate 11, respectively, of FIG. 1. This embodiment utilizes the double group of an active and a dummy set of sense-digit line pairs to achieve sense line noise cancellation. Core 50 is sandwiched between coplanar, parallel sense lines 54 and 56 above and corresponding coplanar, parallel sense lins *54a* and *56a* below. This, in turn, is sandwiched between coplanar, parallel digit lines 58 and 60 above, and corresponding coplanar, parallel digit lines *58a* and *60a* below. On the outermost layers of this sandwich lie word line 62 above and corresponding word line *62a* below. The entire arrangement is such that lines 58, 54, *54a* and *58a*, lines 60, 56, *56a* and *60a*, and lines 62 and *62a* lie in a stacked superposed relationship, respectively. Core 50 is sandwiched between superposed lines 58, 54, *54a* and *58a* and transversely arranged line 62 and *62a* so as to provide optimum coupling between the sense-digit line pairs, having negligible magnetic coupling with superposed lines 60, 56, *56a* and *60a*.

Digit driver 64 is common-coupled at point 66 to digit lines 58 and 60 the far ends of which are coupled to the ends of corresponding digit lines *58a* and *60a* by resistors 68 and 70 respectively, the near ends of which are common-coupled at point 72 to digit driver 64. Input terminal 76 of sense amplifier 74 is coupled to the far end of sense line 56 while input terminal 78 of sense amplifier 74 is coupled to the far end of sense line 54. Sense lines 54 and 56 at their near ends are coupled to resistors 79 and 81, respectively, to the near ends of their corresponding sense lines *54a* and *56a*, respectively. The far ends of sense lines *54a* and *56a* are common-coupled to a common input point 80 of sense amplifier 74 which may be coupled to ground potential. Word driver 82 is coupled to the left-hand ends of word lines 62 and *62a* the opposite ends of which are common coupled at point 84 which may be coupled to ground potential. This embodiment utilizes lines *54a*, *58a*, *56a* and *60a* as signal return lines in place of the ground planes utilized in FIG. 1.

Figure 5:
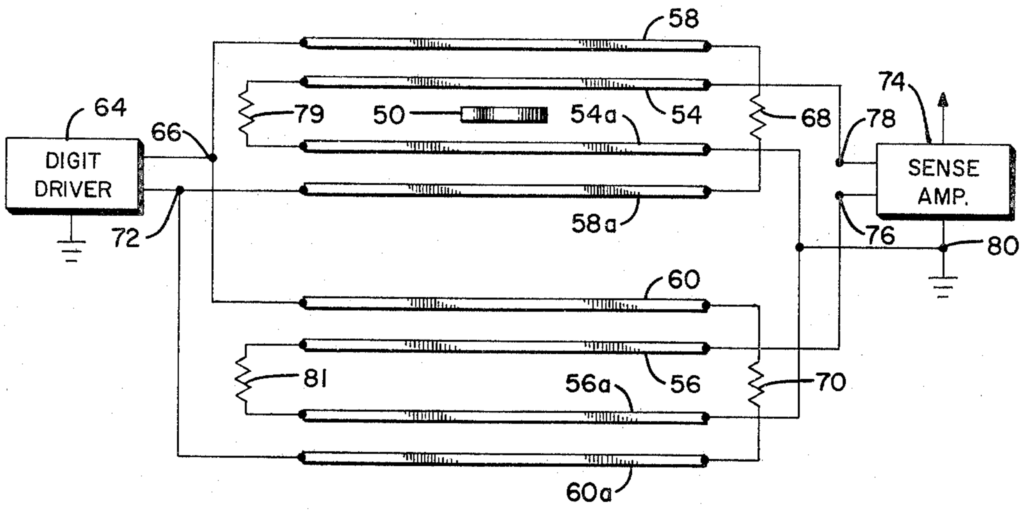
FIG. 5 is a diagrammatic illustration of the circuit schematic of the embodiment of FIG. 4.

FIG. 5 is a diagrammatic illustration of a circuit schematic of embodiment of FIG. 4. In this arrangement, a voltage pulse emanating from digit driver 64 when coupled across pairs of digit lines 58 and 60, and digit lines *58a* and *60a*, at points 66 and 72, respectively, induces negligible noise signals into sense lines 54 and *54a* and sense lines 56 and *56a*, respectively.

The condition for infiinite directivity of the sense lines with respect to the digit lines had been determined by the applicants to be given by the formula:

$$R_s \times R_d = Z_s \times Z_d - Z_{sd}^2$$

where:

$R_s = R_{36} = R_{38} = R_{79} = R_{81}$
$R_d = R_{28} = R_{30} = R_{68} = R_{70}$ $Z_s$=characteristic impedance of the sense line to ground in the presence of the unterminated (i.e., open-circuited) digit line;

$Z_d$=characteristic impedance of the digit line to ground in the presence of the unterminated (i.e., open-circuited) sense line;

$Z_{sd}$=mutual characteristic impedance between the sense line and the digit line.

It has been determined empirically that in many practical embodiments certain points, such as points 56 and 58 of sense lines 32 and 34, respectively, may be directly intercoupled and thence coupled to ground or to their signal return lines through a common resistor whose magnitude is one half that of the calculated magnitude of $R_s$.

Figure 3:
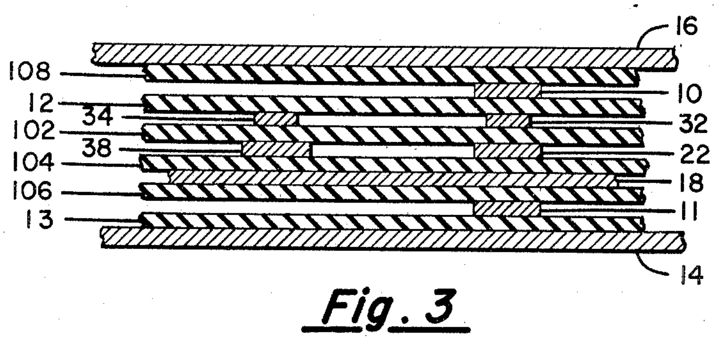
FIG. 3 is a cross-sectional view of the embodiment of FIG. 1 illustrating the stacked relationship of the elements thereof.
Figure 6:
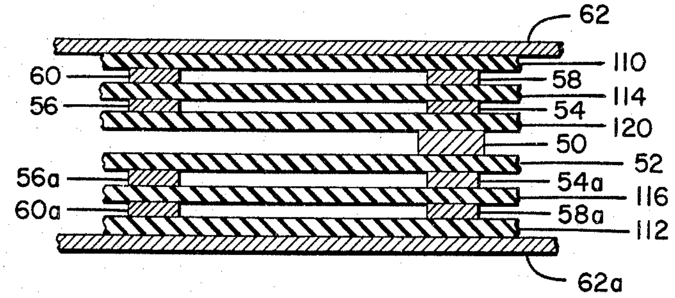
FIG. 6 is a cross-sectional view of the embodiment of FIG. 4 illustrating the stacked relationship of the elements thereof.

It is to be appreciated that the illustrated embodiments of FIGS. 1 and 4 are only presented to illustrate the overall arrangement of thin ferromagnetic film-cores and coupling conductors with no intent to include the necessary supporting and insulating layers. FIGS. 3 and 6 present a diagrammatic illustration of the stacked relationship of a film core with a plurality of printed circuit conductors including the necessary supporting and insulating layers. In FIG. 3 film cores 10 and 11 are disposed upon glass substrates 12 and 13, respectively, with lines 32 and 34, lines 22 and 38 and line 18 disposed upon insulators 102, 104 and 106, respectively. Insulator 108 may be situated between core 10 and ground plane 16 if desired. With regard to FIG. 6 in a similar manner it can be seen that line 62 and lines 58 and 60 may be disposed on the opposite sides of insulator 110 and that line **62*a* and lines 58*a* and 60*a* may be disposed on the opposite sides of insulator 112, while lines 54 and 56 and lines 54*a* and 56*a* may be disposed upon insulators 114 and 116, respectively. Core 50 is disposed upon glass substrate 52 and may be insulated from line 54 by insulator 120**.

A typical core plane assembly may include fabrication of the printed circuit conductors from a 0.0025 inch thick sheet of polyethylene terphtalate copper coated with a 0.00013 thick layer of copper wherein predetermined portions of copper are etched away leaving the printed circuit conductors and wherein a 2,000 Angstrom thick thin ferromagnetic film core is vacuum deposited upon a 0.006 thick glass substrate as disclosed in the aforementioned Rubens Patent No. 2,900,282. The separate elements are then assembled into a single unitary core stack by coating the elements with an adhesive material and pressing the elements together. In view of the above remarks it is to be understood that the illustrations of FIGS. 3 and 6 are not to be intended to represent actual or comparative dimensions or sizes but are presented to better understand the illustrated embodiments of FIGS. 1 and 4.

It is to be understood that suitable modifications may be made in the structure as disclosed provided such modifications come within the spirit and scope of the appended claims. Having now, therefore, fully illustrated and described our invention, what we claim to be new and desire to protect by Letters Patent is set forth in the appended claims.

We claim:

1. A memory apparatus comprising:

a core capable of being set into at least first and second substantially high flux-density remanent magnetic states;

a first line linking said core;

a second line linking said core;

said first and second lines each having a first and a second end, the first ends for each of the lines being positioned adjacent to each other and the second ends for each of the lines being positioned adjacent to each other; and, impedance means coupled to the first end of said second line and to the second end of said first line, the magnitudes of said impedance means selected for causing said second line to have substantially infinite directivity with respect to said first line.

2. A memory apparatus comprising:

first and second separate strip transmission sense lines and first and second separate strip transmission digit lines;

a first thin ferromagnetic film core capable of being set into at least first and second substantially high flux-density remanent magnetic states;

separate first and second signal return means;

said first core, said first sense line and said first digit line arranged in a predetermined relationship between said first and second signal return means;

separate impedance means for coupling predetermined ends of said sense lines and said digit lines to grounding means; and, the magnitudes of said separate impedance means selected for causing said sense lines to have substantially infiinite directivity with respect to said digit lines.

3. The apparatus of claim 2 further including a second core of magnetic material.

4. The apparatus of claim 3 further including a separate strip transmission word line that is oriented transverse said sense lines and said digit lines for forming intersections therewith.

5. The apparatus of claim 4 wherein said first sense line, said first digit line and said word line in the area of their said intersection are substantially magnetically coupled to said first and second cores and wherein said second sense line, said second digit line and said word line in the area of their said intersection are substantially magnetically uncoupled from said first and second cores.

6. The apparatus of claim 5 wherein said first and second signal return means are ground planes.

7. The apparatus of claim 6 wherein said first ground plane, said first core, said first sense line, said first digit line, said word line, said second core and said second ground plane are arranged in that order in a stacked, superposed relationship.

8. A memory apparatus comprising:

a core capable of being set into at least first and second substantially high flux-density remanent magnetic states;

a first strip transmission line linking said core;

a second strip transmission line linking said core;

said first and second lines parallel arranged and each having a first and a second end, the first ends for each of the lines being positioned adjacent to each other and the second ends for each of the lines being positioned adjacent to each other;

means for applying a drive signal to the first end of said first line;

first impedance means $R_s$ coupled to the first end of said second line and second impedance means $R_d$ coupled to the second end of said first line the product of said first and second impedance means $R_s$ and $R_d$ being expressed by the formula, $$R_s \times R_d = Z_s \times Z_d - Z_{sd}^2$$

where:

$Z_s$=characteristic impedance of the second line to ground in the presence of the unterminated first line, $Z_d$=characteristic impedance of the first line to ground in the presence of the unterminated second line, $Z_{sd}$=mutual characteristic impedance of the first line and the second line;

the magnitudes of said first impedance means $R_s$ and and of said second impedance means $R_d$ selected for causing said second line to have substantially infinite directivity with respect to said first line.

9. A memory apparatus comprising:

a thin ferromagnetic film core capable of being set into at least first and second substantially high flux-density remanent magnetic states;

a first pair of parallel strip transmission lines;

a second pair of parallel strip transmission lines;

said first and said second pairs of lines parallel arranged and each having first and second lines;

said first lines of said first and of said second pairs of lines each having a first and a second end, the first ends for each of said first lines being positioned adjacent to each other and the second ends for each of said first lines being positioned adjacent to each other;

said second lines of said first and of said second pairs of lines each having a first and a second end, the first ends for each of said second lines being positioned adjacent to each other and the second ends for each of said second lines being positioned adjacent to each other;

said first lines of said first and of said second pairs of lines linking said core;

means for applying a drive signal to the first ends of the first and second lines of the first pair of lines;

first and second impedance means $R_s$ coupled to the first ends of the first and second lines of the second pair of lines;

first and second impedance means $R_d$ coupled to the second ends of the first and second lines of the first pair of lines;

the product of said first and second impedance means $R_s$ and $R_d$ being expresed by the formula, $$R_s \times R_d = Z_s \times Z_d - Z_{sd}^2$$

where:

$Z_s$=characteristic impedance of the second line to ground in the presence of the unterminated first line, $Z_d$=characteristic impedance of the first line to ground in the presence of the unterminated second line, $Z_{sd}$=mutual characteristic impedance of the first line and the second line;

the magnitudes of said first impedance means $R_s$ and of said second impedance means $R_d$ selected for causing said second line to have substantially infinite directivity with respect to said first line.

References Cited

UNITED STATES PATENTS

| | | | |
|---|---|---|---|
| 3,048,829 | 8/1962 | Bradley | 340—174 |
| 3,098,218 | 7/1963 | Flowers | 340—174 |
| 3,142,049 | 7/1964 | Crawford | 340—174 |
| 3,151,318 | 9/1964 | Luke | 340—174 |

STANLEY M. URYNOWICZ, Jr., Primary Examiner